US011812312B2

(12) United States Patent
Boettger et al.

(10) Patent No.: US 11,812,312 B2
(45) Date of Patent: Nov. 7, 2023

(54) LINK QUALITY BASED SINGLE RADIO-VOICE CALL CONTINUITY AND PACKET SCHEDULING FOR VOICE OVER LONG TERM EVOLUTION COMMUNICATIONS

(71) Applicant: Apple Inc., Cupertino, CA (US)

(72) Inventors: David Boettger, San Jose, CA (US); Tarik Tabet, Los Gatos, CA (US); Samy Khay-Ibbat, San Francisco, CA (US); Farouk Belghoul, Campbell, CA (US); Ajoy K. Singh, Milpitas, CA (US); Thanigaivelu Elangovan, Santa Clara, CA (US); Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 407 days.

(21) Appl. No.: 15/096,138

(22) Filed: Apr. 11, 2016

(65) Prior Publication Data
US 2016/0353316 A1    Dec. 1, 2016

Related U.S. Application Data

(60) Provisional application No. 62/175,955, filed on Jun. 15, 2015, provisional application No. 62/166,079, filed on May 25, 2015.

(51) Int. Cl.
*H04W 28/02* (2009.01)
*H04W 36/00* (2009.01)
(Continued)

(52) U.S. Cl.
CPC ... *H04W 36/0066* (2013.01); *H04W 36/0022* (2013.01); *H04W 36/24* (2013.01);
(Continued)

(58) Field of Classification Search
CPC ......... H04W 36/0022; H04W 36/0066; H04W 36/24; H04W 28/0236; H04W 28/0268;
(Continued)

(56) References Cited

U.S. PATENT DOCUMENTS

| 7,110,422 | B1 * | 9/2006 | Choudhury | ............. H04L 65/80 370/516 |
| 8,848,525 | B2 * | 9/2014 | Li | ........................ H04L 43/087 370/230.1 |

(Continued)

FOREIGN PATENT DOCUMENTS

| CN | 104 602 276 A | 5/2015 |
| EP | 2 254 370 A1 | 11/2010 |

(Continued)

OTHER PUBLICATIONS

Office Action, German Application No. DE 10 2106 207 032.0, dated Jan. 18, 2018, 5 pages.

(Continued)

*Primary Examiner* — Ivan O Latorre
(74) *Attorney, Agent, or Firm* — Kowert, Hood, Munyon, Rankin & Goetzel, P.C.

(57) ABSTRACT

Wireless devices, networks and methods may operate to have a wireless device cause a base station to trigger voice call continuity handovers responsive to the quality of the cellular radio link in addition to the base station triggering such handovers based on location or mobility. Furthermore, wireless communication devices may also perform monitoring of multiple buffers operating within the wireless communication device and associated with different respective communication layers, in addition to monitoring the quality of the cellular radio link, to perform intelligent dropping/discarding and/or scheduling of packets at the wireless communications device. Any one or more of these features may improve the ability of the wireless communications (Continued)

device to achieve stated Voice over Long Term Evolution (VoLTE) performance benchmarks in the context of the realities of current VoLTE networks.

20 Claims, 8 Drawing Sheets

(51) Int. Cl.
*H04W 88/06* (2009.01)
*H04W 36/24* (2009.01)
*H04W 72/12* (2023.01)
*H04W 72/542* (2023.01)

(52) U.S. Cl.
CPC ...... *H04W 72/1221* (2013.01); *H04W 72/542* (2023.01); *H04W 88/06* (2013.01)

(58) Field of Classification Search
CPC ......... H04W 72/1231; H04W 72/1221; H04W 88/06; H04W 24/08; H04W 36/0083
See application file for complete search history.

(56) References Cited

U.S. PATENT DOCUMENTS

| | | | |
|---|---|---|---|
| 8,886,209 B2 | 11/2014 | Shaw et al. | |
| 9,237,495 B2 | 1/2016 | Taneja | |
| 9,253,108 B2 | 2/2016 | Stanwood et al. | |
| 9,288,720 B2 | 3/2016 | Nukala et al. | |
| 2003/0152094 A1* | 8/2003 | Colavito | H04L 29/06027 370/412 |
| 2003/0219014 A1* | 11/2003 | Kotabe | H04L 47/2433 370/375 |
| 2006/0039412 A1* | 2/2006 | Degenhardt | H04L 1/1887 370/516 |
| 2006/0123202 A1* | 6/2006 | Popescu | G06F 11/1633 711/149 |
| 2007/0064679 A1* | 3/2007 | Chitturi | H04L 49/90 370/352 |
| 2007/0116024 A1* | 5/2007 | Zhang | H04L 47/54 370/412 |
| 2007/0249354 A1 | 10/2007 | Seo | |
| 2008/0165766 A1* | 7/2008 | Synnergren | H04L 47/10 370/352 |
| 2009/0196275 A1* | 8/2009 | Damnjanovic | H04W 28/06 370/345 |
| 2009/0257361 A1* | 10/2009 | Deshpande | H04L 43/50 370/252 |
| 2010/0008305 A1* | 1/2010 | Yeo | H04W 72/1252 370/329 |
| 2010/0056157 A1* | 3/2010 | Verona | H04W 36/30 455/438 |
| 2010/0091748 A1* | 4/2010 | Endoh | H04L 47/56 370/338 |
| 2010/0142477 A1* | 6/2010 | Yokota | H04W 36/0072 370/331 |
| 2010/0149976 A1* | 6/2010 | Lee | H04L 47/283 370/231 |
| 2011/0002269 A1* | 1/2011 | Ranta-Aho | H04L 47/10 370/328 |
| 2011/0267951 A1* | 11/2011 | Stanwood | H04L 41/5022 370/235 |
| 2012/0100858 A1* | 4/2012 | Qin | H04W 36/0038 455/437 |
| 2012/0147830 A1* | 6/2012 | Lohr | H04W 72/042 370/329 |
| 2012/0157105 A1* | 6/2012 | Grob-Lipski | H04W 36/32 455/437 |
| 2012/0294179 A1* | 11/2012 | Tafreshi | H04W 36/18 370/252 |
| 2013/0094472 A1 | 4/2013 | Klingenbrunn | |
| 2013/0331091 A1* | 12/2013 | Chang | H04W 52/0229 455/423 |
| 2014/0036930 A1* | 2/2014 | Lih | H04L 49/252 370/429 |
| 2014/0098693 A1* | 4/2014 | Tabet | H04W 36/30 370/252 |
| 2014/0176660 A1 | 6/2014 | Khay-Ibbat | |
| 2014/0204759 A1* | 7/2014 | Guo | H04W 28/08 370/236 |
| 2014/0219246 A1 | 8/2014 | Khay-Ibbat | |
| 2014/0269372 A1* | 9/2014 | Roy | H04L 1/205 370/252 |
| 2014/0328263 A1* | 11/2014 | Chung | H04W 72/12 370/329 |
| 2014/0334442 A1* | 11/2014 | Kanamarlapudi | H04W 36/0022 370/331 |
| 2014/0362830 A1* | 12/2014 | Verger | H04W 36/0072 370/332 |
| 2015/0009816 A1* | 1/2015 | Hsu | H04W 28/0221 370/230.1 |
| 2015/0056995 A1* | 2/2015 | Baillargeon | H04W 36/0022 455/436 |
| 2016/0021673 A1 | 1/2016 | Ahmadzadeh et al. | |

FOREIGN PATENT DOCUMENTS

WO  WO 2009059063 A1  5/2009
WO  WO 2010025022 A1  3/2010

OTHER PUBLICATIONS

First Office Action, Chinese Application for Invention No. 201610347904.0, dated Feb. 2, 2019, 11 pages.

* cited by examiner

LINK QUALITY BASED SINGLE RADIO-VOICE CALL CONTINUITY AND PACKET SCHEDULING FOR VOICE OVER LONG TERM EVOLUTION COMMUNICATIONS

PRIORITY CLAIM

This application claims benefit of priority of U.S. Provisional Patent Application Ser. No. 62/166,079 titled "Link Quality Based Single Radio-Voice Call Continuity and Packet Scheduling for Voice over Long Term Evolution Communications", filed on May 25, 2015, which is hereby incorporated by reference as though fully and completely set forth herein. This application further claims benefit of priority of U.S. Provisional Patent Application Ser. No. 62/175,955 titled "Link Quality Based Single Radio-Voice Call Continuity and Packet Scheduling for Voice over Long Term Evolution Communications", filed on Jun. 15, 2015, which is also hereby incorporated by reference as though fully and completely set forth herein.

FIELD OF THE INVENTION

The present application relates to wireless communications, and more particularly to an apparatus, system, and method for providing link quality based triggering of Single Radio-Voice Call Continuity (SRVCC) and packet scheduling for Voice over Long Term Evolution (VoLTE) communications.

DESCRIPTION OF THE RELATED ART

The use of wireless communication systems is rapidly expanding. As wireless communication systems evolve, successive generations of wireless communication technologies tend to be developed. Adoption of a new generation wireless technology may be a gradual process, during which one or more previous generations of a similar technology may co-exist with the new generation technology, e.g., for a period of time until the new generation wireless technology is fully deployed.

One example of a transition to next generation wireless technology is the transition from circuit-switched (CS) technology to packet-switched (PS) technology, such as voice over LTE (VoLTE), for conducting voice calls. VoLTE technology utilizes a fully packet-switched network and may provide benefits such as improved audio quality (e.g., HD voice) and simultaneous voice and data communications for CDMA carriers. Many operators around the world have deployed VoLTE technology and continue to enhance their VoLTE coverage, and operators have also begun to enable VoLTE roaming across their networks. However, LTE coverage is not ubiquitous. In some scenarios, e.g., due to low, lessening, or absent VoLTE service, it may be desirable or necessary to redirect a wireless device from an ongoing call using VoLTE technology to using a 2G/3G network.

In the course of developing and deploying VoLTE technology on various different wireless communications devices, e.g. mobile devices, certain benchmarks for VoLTE quality communications have been established. One example is a benchmark of "equal to or better than CS" for overall call quality, including call setup and call drop performance as well as voice quality. The purpose of this standard is to ensure that customers don't experience regression in the calling experience when VoLTE is introduced. However, as with most new technologies, the performance reality initially lags behind the performance benchmark. The many causes for this include software bugs, misconfiguration, sub-optimal algorithms, and/or inadequate dimensioning in the network, and/or fundamental differences in the new technology, such as a lower available RF link margin.

In addition, LTE and VoLTE specifies, among others, various Quality of Service Class Identifier (QCI) requirements. QCI is a mechanism employed to ensure bearer traffic is allocated appropriate Quality of Service (QoS). QoS refers to the overall performance of a network, e.g. a wireless communications network such as an LTE network, and particularly to the performance seen by the users of the network. Different bearer traffic requires different QoS and therefore different QCI values, with nine (9) different QCI values currently specified. For example, the VoLTE QCI 1 requirements include a Packet Delay Budget (PDB) which defines an upper bound for the time that a packet may be delayed between the UE and the Policy and Charging Enforcement Function (PCEF).

VoLTE testing in the field has yielded numerous instances of poor voice quality, total loss of audio path, and call drops. For example, in a worst case scenario (e.g. operating on the cell edge, i.e. on the edge of the coverage area of a given cell or eNB), the delay from a mobile device (UE) to the base station (e.g. eNB) can exceed the PDB recommended by the 3GPP guidelines, and such a delay impacts the quality of VoLTE calls. The rate of occurrence of these problems can be significantly higher than with legacy CS calls. Some of these problems have been traced to the link margin of VoLTE, which can be substantially lower than the link margin of legacy CS calls, implying that more LTE cell sites may be needed as infill. But because building new LTE cell sites is expensive and time consuming, this situation may not be remedied in the near future. It is therefore desirable to "rescue" calls which are exhibiting or likely to exhibit poor performance, and/or it is further desirable to better manage delays during VoLTE calls to preserve the user experience.

SUMMARY OF THE INVENTION

In light of the foregoing and other concerns, some embodiments relate to one or more cellular network devices which are configured to better utilize packet-switched voice technologies, such as VoLTE, for user equipment (UE) devices. More specifically, various embodiments disclosed herein relate to a UE device, base station, and/or relay station, and associated method for link quality based triggering of Single Radio-Voice Call Continuity (SRVCC) and intelligent packet scheduling and delay management during wireless communications, e.g. during LTE communications/transmissions.

Single Radio-Voice Call Continuity (SRVCC) provides a transitional mechanism whereby a VoLTE call may be seamlessly handed over to underlying 3G/2G coverage that uses circuit-switched communications. SRVCC is normally used to move voice calls from LTE to legacy 3G or 2G CS networks when a mobile device (wireless communications device) travels outside of the LTE or VoLTE service area. Various embodiments of wireless devices, networks and methods described herein make use of the quality of the cellular radio link to trigger SRVCC instead of using only location-based or mobility-based triggering—as would otherwise be typical with SRVCC. Furthermore, in various embodiments, wireless communications devices may perform buffer monitoring in addition of monitoring the quality of the cellular radio link to perform intelligent dropping/discarding and/or scheduling of packets at the wireless communications device. Any one or more of these features may improve the ability of the wireless communications devices to achieve the stated VoLTE performance benchmark in the context of the realities of current VoLTE networks.

In accordance with the above, in some embodiments, an apparatus may be provided for improved wireless communications, e.g. improved cellular communications such as communications according to LTE. The apparatus may include a processing element that may cause a wireless communication device to establish communication with a first wireless network and monitor at least one of the following:

A link quality of the wireless communications conducted by the wireless communication device with the first wireless network.

Packet delay within a first buffer situated in the wireless communication device and associated with a first communication layer.

The processing element may also cause the wireless communication device to perform at least one of the following:

Cause the first wireless network to trigger a handover to a second wireless network operating according to a different radio access technology than the first wireless network, at least in response to determining that the link quality does not meet specified criteria.

Operate on a first packet that resides within the first buffer, at least in response to determining that the first packet has remained in the first buffer longer than a specified length of time, whereby the specified length of time is of shorter duration than the length of time for which the first packet is allowed to reside in the first buffer when based solely on signaling from the first wireless network.

The link quality may be determined according to performance characteristics associated with one or more communication layers, which may include a real-time transport protocol (RTP) layer, a media access control (MAC) layer, and a physical layer (PHY). The performance characteristics may include one or more characteristics associated with a real-time transport protocol layer (e.g. packet jitter, buffer statistics, packet loss), one or more characteristics associated with a media access control layer (e.g. hybrid automatic repeat request block error rate, downlink assignment size, uplink grant size), and/or one or more characteristics associated with a physical layer (e.g. transmit power of the wireless communication device, link margin, reference signal received power, reference signal received quality, signal-to-interference-plus-noise ratio.)

In some embodiments, in order to cause the first wireless network to trigger a handover, the processing element may cause the wireless communication device to adjust measured values indicative of the link quality and transmit, the adjusted measured values to the first wireless network. The adjusted measured values may be indicative of worse link conditions than those (actual conditions) indicated by the measured values. Alternatively, in some embodiments, in order to cause the first wireless network to trigger a handover, the processing element may cause the wireless communication device to transmit a signaling message to the first wireless network requesting that the first wireless network perform the handover. This signaling message may be a non-access stratum enhanced service request message comprising extensions compatible with the first wireless network.

In some embodiments, in order to cause the wireless communication device to operate on the first packet, the processing element may cause the wireless communication device to schedule the first packet for transmission, at least in response to determining that the first packet has not been previously scheduled for transmission, and/or discard the first packet, at least in response to determining that the first packet has been previously scheduled for transmission and has not been successfully transmitted. The wireless communication device may schedule the first packet for transmission further in response to determining that transmit time intervals are available for uplink transmission. Furthermore, the wireless communication device may discard the first packet further in response to determining that there have previously been a specified number of unsuccessful retransmission attempts of the first packet. In some embodiments, the first packet is a radio link control (RLC) packet segment corresponding to a packet data convergence protocol (PDCP) packet, and the RLC packet segment is one of a number of RLC packet segments corresponding to the PDCP packet.

Further pursuant to the above, a wireless communication device may include radio circuitry that facilitates wireless communications of the wireless communication device, and may further include control circuitry that interoperates with the radio circuitry to cause the wireless communication device to establish communications with a first wireless network. The wireless communication device may monitor metrics associated with the wireless communications of the wireless communication device with the first wireless network, and may cause the first wireless network to trigger a handover to a second wireless network operating according to a different radio access technology than the first wireless network, in response to determining that the metrics do not meet a specified set of criteria. In some embodiments, the metrics include performance characteristics associated with one or more communication layers. The wireless communication device may cause the first wireless network to trigger a handover by adjusting one or more actual values of the metrics—with the adjusted values being indicative of worse conditions within the first wireless network than the conditions indicated by actual values of the metrics—and transmitting the one or more adjusted values of the metrics to the first wireless network.

Further pursuant to the above, in some embodiments, a wireless communication device may establish communications with a wireless network, monitor a first buffer residing in the wireless communication device and associated with a first communication layer, and may also monitor a second buffer residing in the wireless communication device and associated with a second communication layer. The wireless communication device may operate on one or more first packets residing in the first buffer, based on how long the one or more packets have been residing in the first buffer, and further based on status information corresponding to one or more second packets corresponding to the one or more first packets and residing in the second buffer. The second communication layer may be lower than the first communication layer within a hierarchy of communication layers that include the first communication layer and the second communication layer. In one set of embodiments, the first communication layer is an RLC layer and the second communication layer is a MAC layer. In these embodiments, the one or more first packets are RLC packet segments and the one or more second packets are MAC packet data units.

The wireless communication device may operate on each respective first packet of the one or more first packets for which it has been determined that the respective first packet has remained in the first buffer longer than a specified length of time, where the specified length of time is shorter than a time duration for which each respective first packet is allowed to reside in the first buffer according to a delay budget associated with the first buffer and established by the wireless network. In some embodiments, the wireless communication device may perform at least one of the following for each selected first packet of the one or more first packets:

Schedule for transmission a respective second packet to which the selected first packet is mapped, at least in response to determining that the respective second packet has not been previously scheduled for transmission.

Discard the selected first packet, at least in response to determining that the respective second packet has been previously scheduled for transmission but has not been successfully transmitted.

The wireless communication device may schedule the respective second packet for transmission further in response to determining that transmit time intervals are available for uplink transmission of the respective second packet. The wireless communication device may discard the selected first packet further in response to determining that there have previously been a specified number of unsuccessful retransmission attempts of the respective second packet.

In one set of embodiments, the selected first packet corresponds to a respective third packet associated with a first protocol, and at least one other first packet of the one or more first packets also corresponds to the respective third packet, and a respective second packet to which the at least one other first packet is mapped has already been transmitted. In some embodiments, the wireless communication device may discard a selected first packet, in response to determining that a respective second packet to which the selected first packet is mapped has been previously scheduled for transmission but has not been successfully transmitted, and the selected first packet corresponds to a current third packet associated with a first protocol, with at least one other first packet of the one or more first packets corresponding to the current third packet, and a respective second packet—to which the at least one other first packet is mapped—has already been transmitted. The wireless communication device may also operate on newly selected one or more first packets corresponding to a next third packet associated with the first protocol, subsequent to discarding the selected first packet. The communications established by the wireless communication device with the wireless network may be connected-mode discontinuous reception (CDRX) communications, and the wireless communication device may segment received audio packets at the first communication layer as soon as an audio packet is available from a real time transport protocol, instead of bundling audio packets as a function of the CDRX.

Further pursuant to the above, in some embodiments, a wireless communication device may establish communications with a wireless network. During the wireless communications, the wireless communication device may monitor one or more packet segments of a number of packet segments of a whole packet associated with a first communication layer, where the whole packet has been previously segmented into the number of packet segments, and may discard the number of packet segments in response to determining that a single packet segment of the one or more packets segments has to be discarded. The wireless communication device may determine whether the single packet segment has to be discarded based on a time period for which the single packet segment has been residing in a first buffer associated with a second communication layer, and/or a number retransmission attempts of the single packet segment from a second buffer associated with a third communication layer. In one set of embodiments, the first communication layer is an RTP layer, the second communication layer is an RLC layer, and the third communication layer is a MAC layer. Accordingly, the first buffer may be an RLC buffer, and the second buffer may be a HARQ buffer.

Note that the techniques described herein may be implemented in and/or used with a number of different types of devices, including but not limited to, base stations, access points, cellular phones, portable media players, tablet computers, wearable devices, and various other computing devices and/or wireless communication devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

Figure 1:
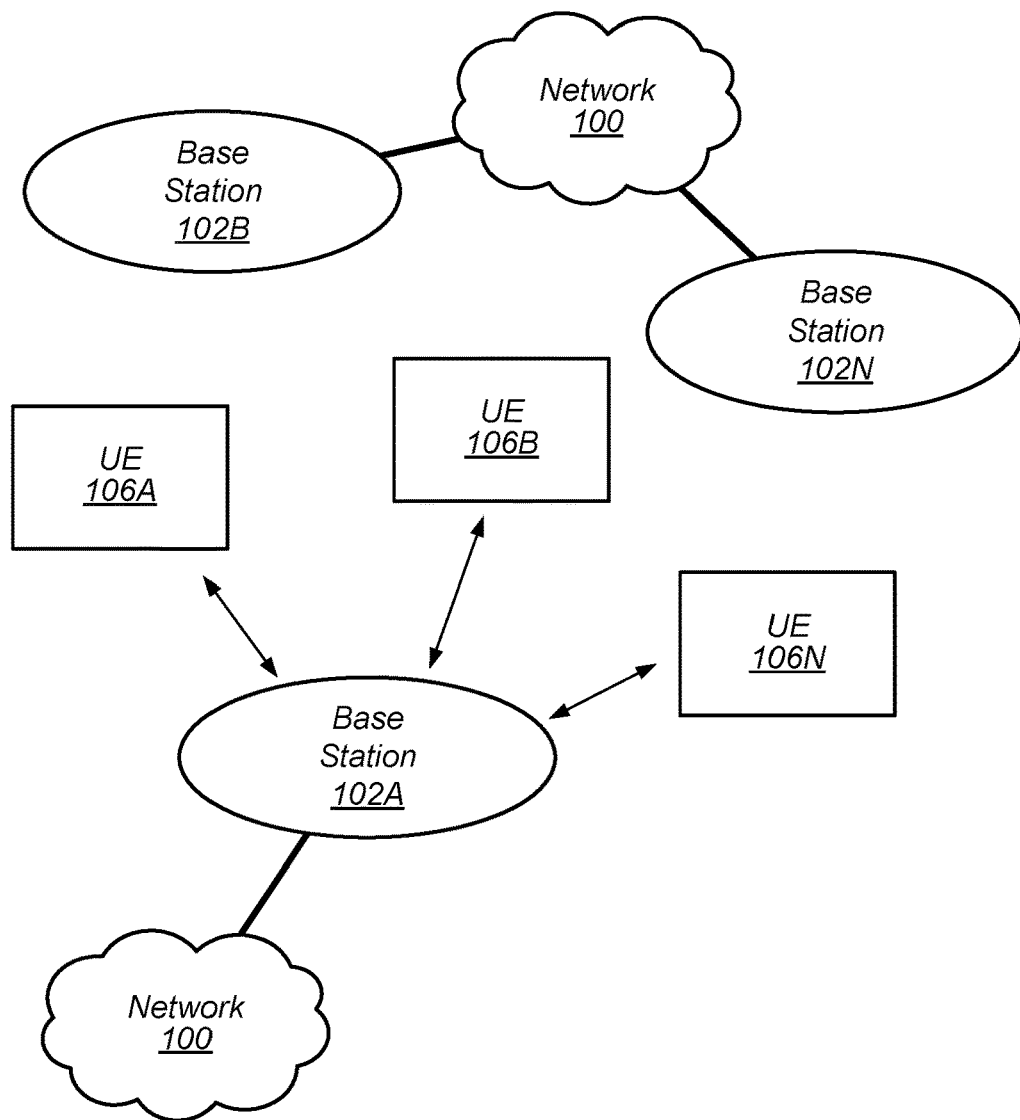
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR: Adaptive Multi-Rate
ARQ: Automatic Repeat Request (also: Automatic Repeat Query)
BS: Base Station
CCE: Control Channel Elements
CDRX: Connected-Mode Discontinuous Reception
CFI: Control Frame Indicator
CQI: Channel Quality Indicator
CS: Circuit-Switched
CSFB: Circuit-Switched Fallback
DL: Downlink (from BS to UE)
ENB (or eNB): eNodeB (Base Station)
GSM: Global System for Mobile Communication
HARQ: Hybrid Automatic Repeat Request
LTE: Long Term Evolution
MAC: Media Access Control (layer)
NW: Wireless Network
OAM: Operations, Administration, and Management
OFDM: Orthogonal Frequency-Division Multiplexing
PCEF: Policy and Charging Enforcement Function
PDB: Packet Delay Budget
PDCP: Packet Data Convergence Protocol
PDU: Protocol Data Unit
PHY: Physical (Layer)
PS: Packet-Switched
QCI: Quality of Service Class Identifier
QoS: Quality of Service
RAT: Radio Access Technology
REG: Resource Element Group
RLC: Radio Link Control
RNC: Radio Network Controller
RNTI: Radio Network Temporary Identifiers
RRC: Radio Resource Control
RSRP: Reference Signal Received Power
RSRQ: Reference Signal Received Quality
RSSI: Reference Signal Strength Indicator
RTP: Real-time Transport Protocol
RX: Reception
SINR: Signal-To-Interference-Plus-Noise Ratio
SRVCC: Single Radio-Voice Call Continuity
TB: Transport Blocks
TTI: Transmission Time Interval
TX: Transmission
UE: User Equipment
UL: Uplink (from UE to BS)
ULSCH: Uplink Shared Channel
UMTS: Universal Mobile Telecommunication System
VoLTE: Voice over LTE Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Also referred to as wireless communication devices. Examples of UE devices include mobile telephones or smart phones (e.g., iPhone™, Android™-based phones) and tablet computers such as iPad™ Samsung Galaxy™, etc., portable gaming devices (e.g., Nintendo DS™, PlayStation Portable™, Gameboy Advance™, iPod™), laptops, wearable devices (e.g. Apple Watch™, Google Glass™) PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of electronic devices, e.g. computer system devices, which perform wireless communications such as wireless local area network (WLAN) communications, cellular communications according to one or more of a number of different cellular radio access technologies, Wi-Fi communications, and the like. The wireless communication device may wirelessly communicate through one or more respective radio frequency (RF) interfaces that facilitate such communications. As used herein, the term "wireless device" may refer to a UE device, as defined above, or to a stationary device, such as a stationary wireless client or a wireless base station. For example a wireless device may be any type of wireless station of an IEEE 802.11 system, such as an access point (AP) or a client station, or any type of wireless station of a cellular communication system communicating according to one or more cellular radio access technologies (e.g. LTE, CDMA, GSM), such as a base station (or cellular tower) or a cellular telephone, for example. A wireless device may communicate according to multiple different radio access technologies, for example over multiple RF interfaces.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Channel—a medium used to convey information from a sender (transmitter) to a receiver. It should be noted that since the definition of the term "channel" may differ according to different wireless protocols, the term "channel" as used herein should be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while BLUETOOTH™ channels may be 1 MHz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component FIGS. 1 and 2—Communication System FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless cellular communication system includes a base station 102 which communicates over a transmission medium with one or more user devices 106A through 106N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless cellular communication with the UEs 106A through 106N. The base station 102 may also be equipped to communicate with a network 100. Thus, the base station 102 may facilitate communication between the UEs and/or between the UEs and the network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In that sense, the base station 102 may be considered a part of network 100. The communication area (or coverage area) of each base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the UEs may be configured to communicate over the transmission medium using any of various wireless radio access technologies (RATs), also referred to as communication technologies or telecommunications standards including but not limited to GSM, UMTS (WCDMA), LTE, LTE-Advanced (LTE-A), LAA/ LTE-U, 3GPP2 CDMA2000 (e.g., 1xRTT, 1xEV-DO, HRPD, eHRPD), Wi-Fi, WiMAX etc., and any of various 3G, 4G, 5G or future telecom standards. Base station 102 and other similar base stations operating according to the same or a different cellular communication standard may thus be provided as a network of cells, which may provide continuous or nearly continuous overlapping service to UE 106 and similar devices over a wide geographic area via one or more cellular communication standards. In some embodiments, UE 106 may operate to perform link quality based single radio-voice call continuity and packet scheduling for VoLTE communications, at least according to the various methods as described herein.

In some embodiments, UE 106 may be capable of communicating using multiple wireless communication standards or RATs. For example, a UE 106 might be configured to communicate using two or more of GSM, UMTS, LTE, LTE-Advanced CDMA2000, WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

Figure 2:
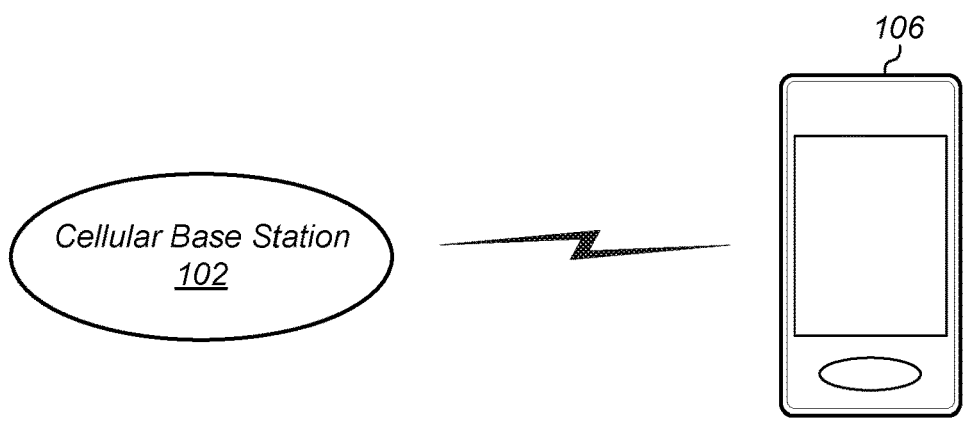
FIG. 2 illustrates an exemplary base station in communication with an exemplary user equipment (UE), according to some embodiments.

FIG. 2 illustrates an exemplary user equipment 106 (e.g., one of the devices 106A through 106N) in communication with the base station 102, according to some embodiments. As defined above, the UE 106 may be a device with wireless cellular network connectivity such as a mobile phone, a hand-held device, a computer or a tablet, a wearable device or virtually any type of wireless device. The base station may be a cellular base station that communicates in a wireless cellular manner with one or more UEs. The base station may include a processing element such as one or more of a processor, an ASIC (application specific integrated circuit), an FPGA (field-programmable gate array) or some combination thereof.

The base station, such as the processing element in the base station, may perform any of the methods described herein, or any portion of any of the method embodiments described herein. Other cellular network devices, described below, may also be configured to perform some or all of the methods described herein, possibly in conjunction with the base station.

The UE may include a processing element such as one or more of a processor, an ASIC (application specific integrated circuit), an FPGA (field-programmable gate array) or some combination thereof. The UE, such as the processing element in the UE, may perform any of the methods described herein as being performed by a UE.

In some embodiments, the UE 106 may be configured to communicate using any of multiple wireless communication protocols as described above. The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. In other embodiments, the UE 106 may include separate transmit and/or receive chains (e.g., including separate antennas and other radio components) for each wireless communication protocol with which it is configured to communicate. In still other embodiments, the UE 106 may include one or more radios which are shared between multiple wireless communication protocols, and one or more radios which are used exclusively by a single wireless communication protocol. For example, in one set of embodiments, the UE 106 may include a shared radio for communicating using either of LTE or 1xRTT, and separate radios for communicating using each of Wi-Fi and BLUETOOTH™. Other configurations are also possible.

In some embodiments, the UE 106 may be configured to communicate using a first radio access technology which provides packet-switched (PS) services, and/or a second radio access technology which provides PS services and CS services, and/or third radio access technology which provides CS services. If the UE 106 is using the first radio access technology and determines that some action is desired in order to maintain transmission quality (e.g. quality of a voice call), the UE may attempt to trigger, under certain conditions and based on link quality, an SRVCC handover to a network that supports CS services, and/or it may attempt to schedule and/or discard packets proactively during wireless communications with the network that supports the first radio access technology.

Figure 3:
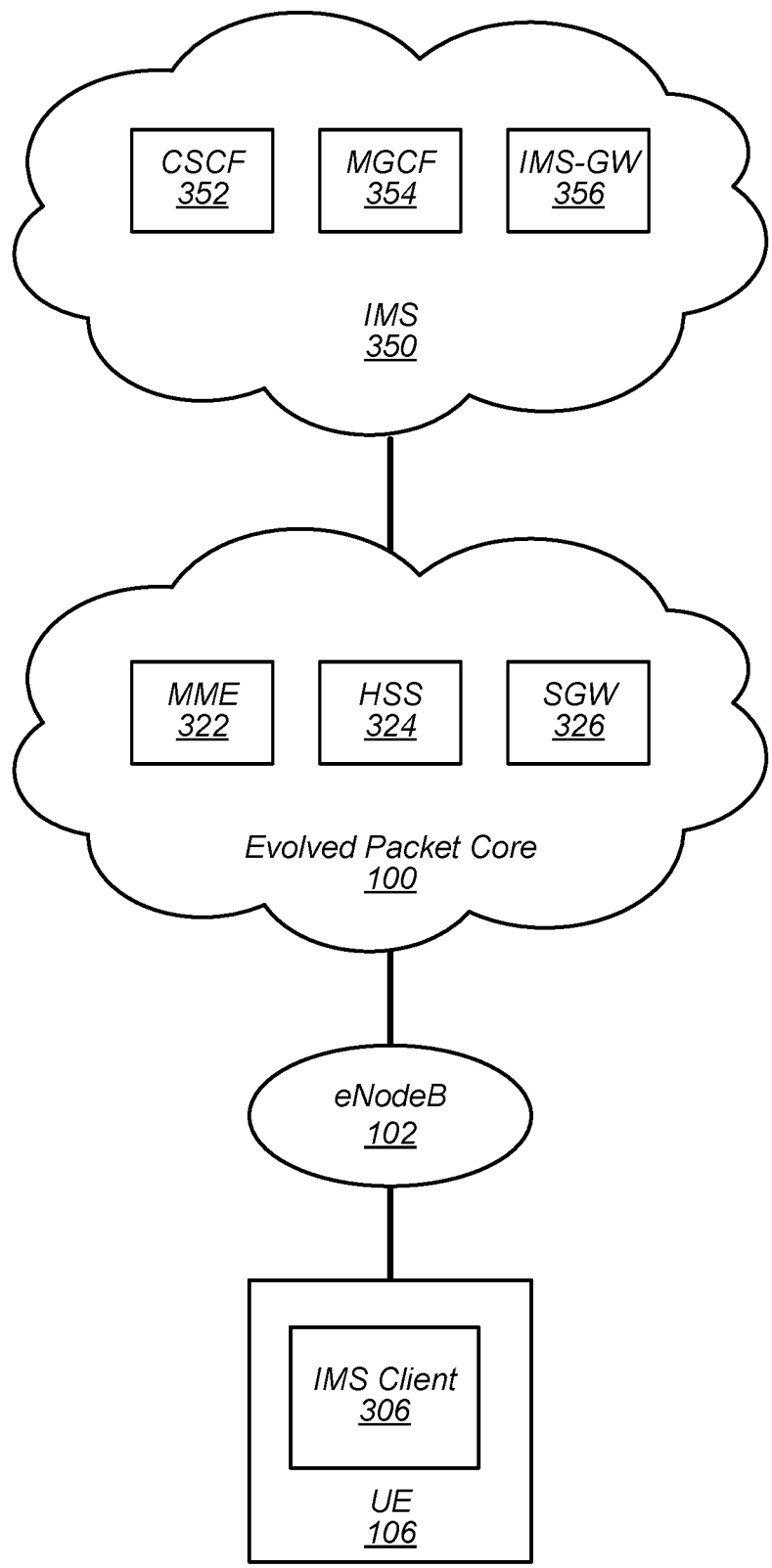
FIG. 3 illustrates an exemplary cellular network system, according to some embodiments.

FIG. 3 illustrates a simplified portion of an exemplary wireless communication system that may be particularly useful for implementing voice or video over IP communications, such as voice over LTE (VoLTE) communications in an LTE network. As shown, the UE 106 may include an IP multimedia subsystem (IMS) client 306, e.g., which may be implemented in various different ways, using hardware and/or software. For example, in some embodiments, software and/or hardware may implement an IMS stack that may provide desired IMS functionalities, e.g., including registration, AKA authentication with IPSec support, session setup and resource reservations, etc.

The UE 106 may be in communication with a cellular network, where the cellular network may include a base station 102, an evolved packet core (EPC) 100 and an IMS system 350, as shown. In this example embodiment the base station is shown as an eNodeB 102. The UE 106 may communicate in a wireless manner with the base station (eNodeB) 102. In turn, the eNodeB 102 may be coupled to a core network, shown in this example embodiment as an evolved packet core (EPC) 100. As shown, the EPC 100 may include mobility management entity (MME) 322, home subscriber server (HSS) 324, and serving gateway (SGW) 326. The EPC 100 may also include various other devices known to those skilled in the art.

The EPC 100 may be in communication with the IMS 350. The IMS 350 may include call session control function (CSCF) 352, which may itself include a proxy CSCF (P-CSCF), interrogating CSCF (I-CSCF), and/or serving CSCF (S-CSCF), as desired. The IMS 350 may also include media gateway controller function (MGCF) 354 and IMS management gateway (IMS-MGW) 356. Similar to the EPC 100, the IMS 350 may also include various other devices known to those skilled in the art.

Operations described herein as being performed by the cellular network may be performed by one or more of the cellular network devices shown in FIG. 3, such as one or more of base station, 102, MME 322, HSS 324, or SGW 326 in EPC 100, or CSCF 352, MGCF 354 or IMS-GW 356 in IMS system 350, among possible others.

Figure 4:
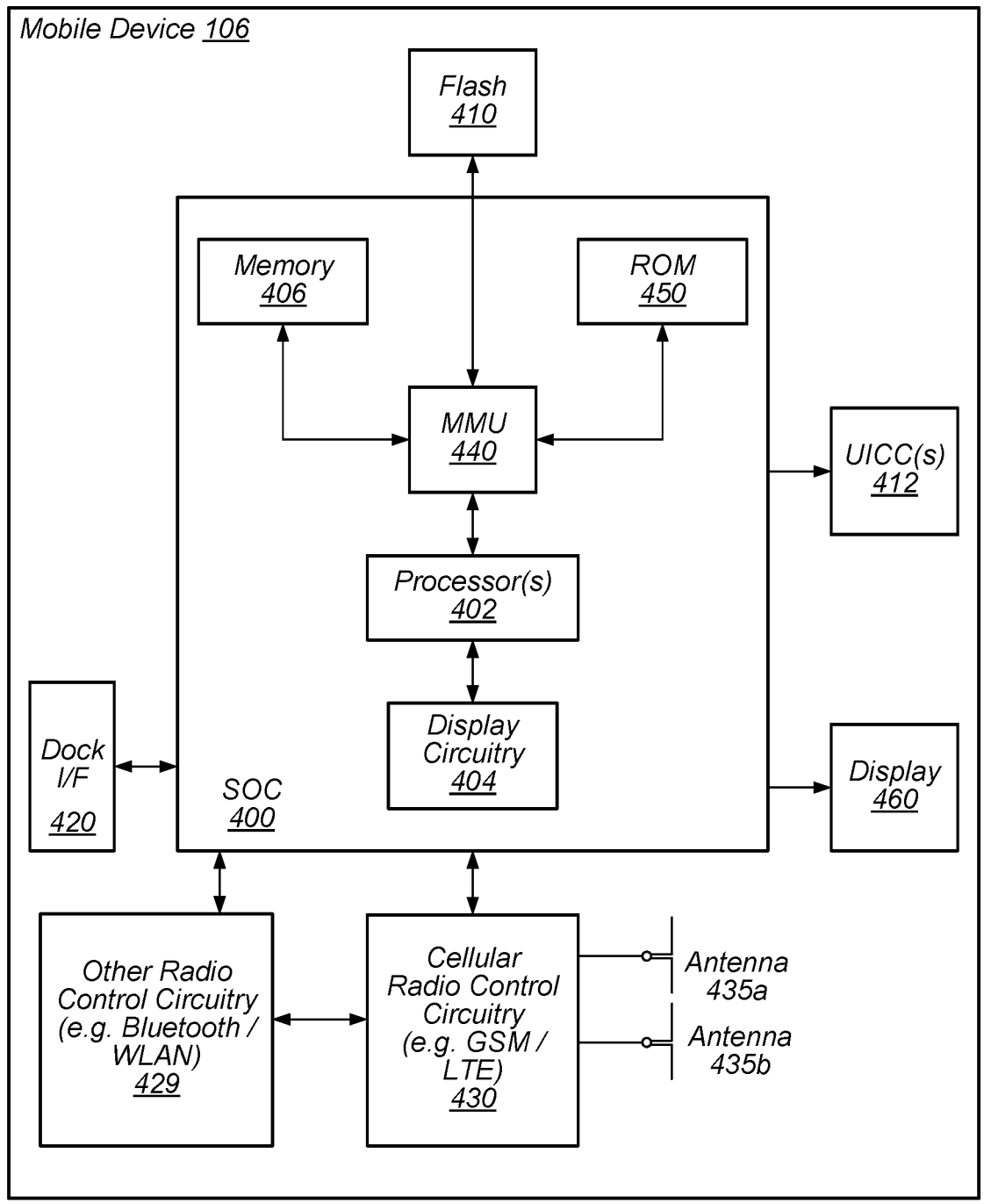
FIG. 4 shows a block diagram of an exemplary UE, according to some embodiments.

FIG. 4—Block Diagram of an Exemplary UE

FIG. 4 illustrates a block diagram of an exemplary UE 106, according to some embodiments. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, radio 430, connector I/F 420, and/or display 460. The MMU 440 may be configured to perform memory protection and page table translation or set up. In some embodiments, the MMU 440 may be included as a portion of the processor(s) 402.

In the embodiment shown, ROM 450 may include a bootloader, which may be executed by the processor(s) 402 during boot up or initialization. As also shown, the SOC 400 may be coupled to various other circuits of the UE 106. For example, the UE 106 may include various types of memory (e.g., including Flash memory 410), a connector interface 420 (e.g., for coupling to the computer system), the display 460, and wireless communication circuitry 429 and 430 (e.g., for LTE, LTE-A, CDMA2000, GSM, BLUETOOTH™, Wi-Fi, etc.). The UE device 106 may include at least one antenna (e.g. antenna 435a), and in some embodiments multiple antennas (e.g. illustrated by antennas 435a and 435b), for performing wireless cellular communication with base stations and/or wireless communication with base stations and/or other devices. Antennas 435a and 435b are shown by way of example, and UE device 106 may include fewer or more antennas. Overall, the one or more antennas are collectively referred to as antenna 435. For example, the UE device 106 may use antenna 435a to perform the wireless cellular communications and may use antenna 435b for another type of wireless communications, or it may use antennas 435a and 435b for any of the wireless communications supported by UE device 106, as required. As noted above, the UE may be configured to communicate wirelessly using multiple wireless communication standards (multiple RATs) in some embodiments.

As described herein, the UE 106 may include hardware and software components for implementing methods according to embodiments of this disclosure.

The processor(s) 402 of the UE device 106 may be configured to implement part or all of the methods described herein, e.g., by executing program instructions stored on a memory medium (e.g., a non-transitory computer-readable memory medium). In other embodiments, processor(s) 402 may be configured as a programmable hardware element, such as an FPGA (Field Programmable Gate Array), or as an ASIC (Application Specific Integrated Circuit). Furthermore, processor(s) 402 may be coupled to and/or interoperate with other components as shown in FIG. 4, to implement communications by UE 106 that incorporate link quality based single radio-voice call continuity and packet scheduling according to various embodiments disclosed herein. Specifically, processor(s) 402 may be coupled to and/or may interoperate with other components as shown in FIG. 4 to facilitate UE 106 maintaining voice call continuity according to various embodiments described herein. Processor(s) 402 may also implement various other applications and/or end-user applications running on UE 106).

Figure 5:
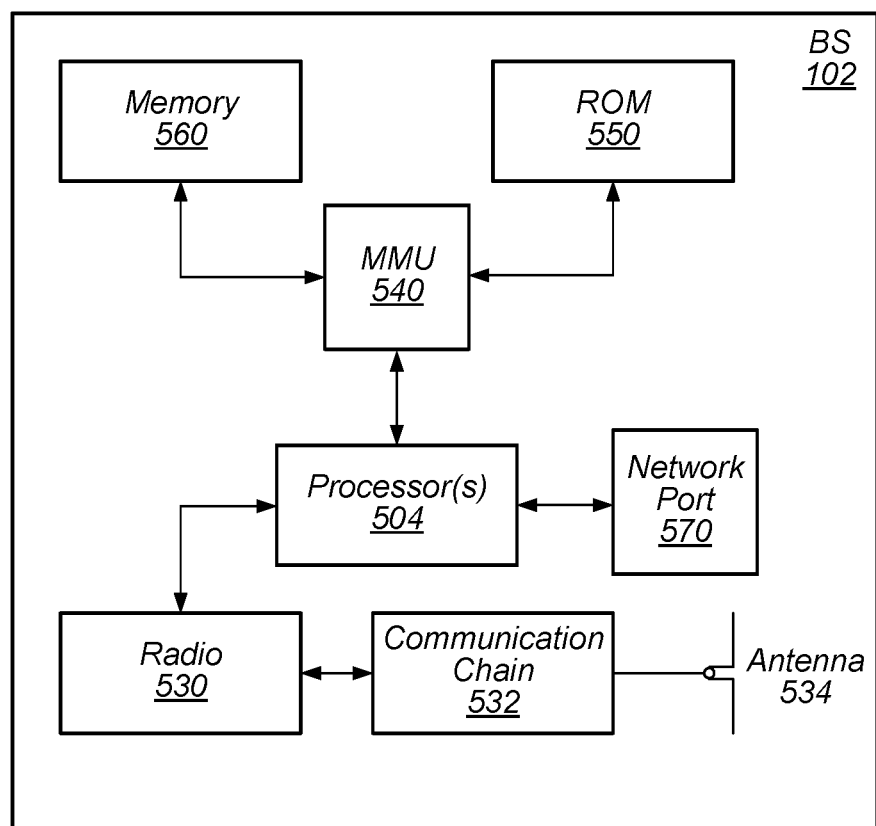
FIG. 5 shows a block diagram of an exemplary base station, according to some embodiments.

FIG. 5—Base Station

FIG. 5 illustrates the block diagram of an exemplary base station 102, according to some embodiments. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described above in FIGS. 1 and 2. The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices 106 serviced by the cellular service provider).

The base station 102 may include at least one antenna 534, and possibly more antennas. The (at least one) antenna 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various RATs, including, but not limited to, GSM, UMTS, LTE, LTE-A, WCDMA, CDMA2000, etc.

The processor(s) 504 of the base station 102 may be configured to implement part or all of the methods described herein, e.g., by executing program instructions stored on a memory medium (e.g., a non-transitory computer-readable memory medium), for base station 102 to communicate with a wireless communication device that performs link quality based single radio-voice call continuity and packet scheduling, as described herein. Alternatively, the processor 504 may be configured as a programmable hardware element, such as an FPGA (Field Programmable Gate Array), or as an ASIC (Application Specific Integrated Circuit), or a combination thereof.

As also used herein, from the perspective of UEs, a base station may sometimes be considered as representing the wireless network (NW) insofar as uplink and downlink communications of the UE are concerned. Thus, a UE communicating with one or more base stations in the network (NW) may also be interpreted as the UE communicating with the NW. In other words, the UE transmitting and/or receiving data to/from the NW may also be interpreted as the UE transmitting and/or receiving data to/from a base station operating within the NW.

Link Quality-Based SRVCC

In one set of embodiments, the SRVCC framework defined in the 3GPP specifications may be leveraged to ensure high quality of calls that are exhibiting or likely to exhibit poor performance. While SRVCC is normally used to transfer voice calls from LTE networks to legacy networks when a wireless communications device leaves the LTE or VoLTE coverage area, instead of (or in addition to) using location-based and/or mobility-based triggering, the quality of the cellular radio link may (also) be used to trigger SRVCC. That is, in addition to regular SRVCC, link quality-based SRVCC (LQ-SRVCC) may also be performed by the wireless communication device and other network elements/devices involved in SRVCC.

Various embodiments of an LQ-SRVCC may include a heuristics engine which evaluates link quality, (in some embodiments it may evaluate link quality on an ongoing basis or continuously, as desired) and initiates SRVCC when certain conditions are met. In some embodiments, the heuristics engine may be implemented as a Radio Access Technology (RAT) manager. Various heuristics, or various metrics or measurements, may be obtained and/or monitored to keep the call in a wireless network operating according to a first RAT, for example in VoLTE mode as much as possible, and initiate a handover, e.g. trigger SRVCC to a wireless network operating according to a second RAT (e.g. 3G, 2G) early enough that the procedure may be completed before there is excessive interruption to the voice conversation and/or before a radio link failure occurs. The RAT manager may take into account numerous metrics when evaluating link quality, including but not limited to the following:

Associated with the RTP Layer
  Packet delay
  Packet jitter and jitter buffer statistics
  Packet loss
Associated with the MAC Layer
  HARQ block error rate (BLER)
  Downlink assignment size
  Uplink grant size
Associated with the Physical Layer
  UE transmit power/power headroom
  Link margin and RSRP
  RSRQ and SINR.

At the present time the 3GPP specifications do not allow a UE device to initiate the SRVCC procedure autonomously. However, a proprietary mechanism may be implemented for a UE to invoke the SRVCC procedure based on link quality. In one set of embodiments, LQ-SRVCC may be implemented by transmitting modified metrics and/or measurements to the network (or to the base station). That is, the metrics transmitted to the network (or base station) may be modified from their actual present values in order to cause the network to trigger a handover. For example, a UE may transmit artificially reduced values of the metrics, such as reduced values of the actual RSRP (Reference Signal Received Power) and/or RSRQ (Reference Signal Received Quality) measurements to the network in order to cause the network to invoke the SRVCC procedure in situations where the network would otherwise not invoke such a procedure, for example because the UE has not relocated outside the LTE coverage region. This functionality may be based on knowledge of how networks (base stations) currently trigger SRVCC.

In some embodiments, LQ-SRVCC may be initiated by utilizing a signaling message, such as the NAS (Non-Access Stratum) Enhanced Service Request message, with proprietary extensions agreed upon a priori with the network designed to convey the UE's desire to undergo SRVCC for link quality reasons.

Intelligent Packet Scheduling at the Wireless Communications Device

In VoLTE UL deployments, the delay from the UE to the eNB is governed by three factors:

Packet Generation. The delay (or time duration) incurred while packets are generated before being routed to the lower layers. This delay depends on the adaptive multi rate encoder, real time protocol stack, jitter buffer and the length of Connected Discontinuous Reception transmissions (~40 ms), among others.

PDCP discard timer. This is related to the delay between generation of a packet and actual transmission of the generated packet. That is, it is the time duration for which a Packet Data Convergence Protocol (PDCP) packet's corresponding Radio Link Control (RLC) packet segments are stored in the RLC buffer before being transmitted. The discard timer specifies an upper limit or maximum time period/duration for which a packet (or packet segment) may remain in the RLC buffer before the packet is dropped. E.g. according to the VoLTE QCI 1 specification, this time limit is ~100 ms. If the (e.g. audio) packet remains in the RLC buffer longer than the allotted maximum time period/duration specified by the protocol (e.g. 100 ms in case of VoLTE), i.e. if the presence of the packet (segment) in the RLC buffer exceeds the allowed maximum time duration, the packet (segment) is dropped.

HARQ retransmission delay. The transmission delay between the physical layer of the UE and the physical layer of the eNB. The retransmission delay depends on the eNB (base station) configuration, and is related to a maximum HARQ retransmit parameter associated with packets stored in the HARQ buffer (in the MAC layer) of the wireless communication device. For example, at cell edge (in this case at the edge of the wireless coverage for the given radio access technology, e.g. LTE), the eNB might configure the UE with a specified retransmit time duration (e.g. 4×4TTI-B, which is equivalent to 52 ms), also referred to as HARQ retransmit delay. If the retransmission isn't successful during that time period, then the UE drops the packet. In other words, the UE drops the packet if the HARQ retransmit delay is reached or exceeded.

As noted above, in a worst case scenario (e.g. at the cell edge), the transmission delay from the UE to the eNB may exceed the time duration (in this case 100 ms) allowed by the protocol (in this case 3GPP) guidelines. The excessive delay may impact the quality of VoLTE call, therefore it may be desirable to implement an improved packet scheduling and/or packet delay management of VoLTE while the UE is camping on LTE.

As described above, based on current QoS-based requirements for VoLTE, there is an upper bound for the time period/duration for which a packet may be delayed between the UE and the Policy and Charging Enforcement Function (PCEF). The PCEF provides user traffic handling and QoS at the network/base station. Overall, the PCEF is responsible for providing controller functions in traffic handling and QoS at the base station over the user plane, and providing service data flow detection, including online and offline different charging interactions. Thus, there is an upper bound for the time period that may elapse before a packet is relayed from the UE to the base station. Based at least on this upper bound, if the delay from the UE to the eNB exceeds the delay recommended by the 3GPP guidelines (e.g. 100 ms), then that delay impacts the quality of VoLTE call.

Therefore, in one set of embodiments, a mechanism may be implemented to include intelligent packet scheduling and/or packet delay management for improving the quality of calls for wireless communications devices camping on a given packet switched data network operating according to a given RAT. That is, intelligent packet scheduling, packet delay management, and dropping of packets may be performed on the wireless communication device while the device is camping on the given wireless network of a specific RAT, such as LTE. Under the current specifications, a UE is compelled to continue retransmitting unsuccessfully transmitted packets until a maximum number of unsuccessful retries has been reached. In the end, the packet is finally dropped after the requisite number of maximum retries has been exhausted. However, continuing to retransmit packets that cannot foreseeably be successfully retransmitted may unduly waste resources that could be better used to improve the QoS.

In accordance with the above, a wireless communications device (e.g. UE) may implement a number of mechanisms to schedule packets for delivery, and control the packet delay for wireless communications, e.g. for VoLTE communications. In some embodiments, the wireless communications device may monitor buffers in multiple layers to ascertain the status of packets and/or packet segments. For example, a first-layer buffer (e.g. RLC buffer) may be monitored, and a second-layer buffer (e.g. HARQ) may also be monitored. In some cases the UE may determine that it is preferable to drop packets proactively so that new packets may be generated and the resources may be better used to that effect. It should be noted that in current systems the determination of when to drop packets is made by the network (eNB). In an improved scheduling and monitoring scheme, the UE may use a second timer while monitoring packets in some of the buffers. The second timer is in addition to a first timer (e.g. PDCP discard timer) operated at the base station. The second timer may specify a lower time duration limit than what is signaled by the eNB (NW). Thus, the UE may use this second timer while monitoring packets in the first layer, e.g. in the RLC layer, and make packet scheduling and/or packet discard decisions regarding packets in the buffer(s) in the first layer and the other layers (e.g. in a lower layer such as MAC layer) based at least on the second timer.

When packets in the RLC buffer are too large to be transmitted in a single RLC segment, those packets may be divided into multiple RLC packet segments which are intended to be transmitted continuously. Each of the segments is then expected to be received over at the eNB so that the eNB may reconstruct/recover the entire PDCP packet. Thus, monitoring not only the RLC buffer(s) but also the HARQ buffer(s), and further using a shorter time period before potentially discarding certain packets or packet segments, additional flexibility for packet scheduling and/or discarding packets may be obtained. According to present LTE specifications, once a first RLC packet segment corresponding to a first PDCP layer packet had been transmitted, all RLC packet segments corresponding to the first PDCP packet are expected to be transmitted. However, in one set of embodiments, the UE may make a decision—depending on various monitored metrics that may include metrics corresponding to RF conditions and metrics corresponding to buffer conditions in at least two different layers—whether to drop additional RLC segments corresponding to a first PDCP layer packet, and use the opportunity to undertake transmitting new data incoming from the PDCP layer.

For example, a packet in a first-layer buffer (e.g. RLC buffer) may have been broken up into corresponding packet segments, which are then moved to and stored in a second-layer buffer (e.g. HARQ buffer) from which the segments are transmitted. A first RLC packet segment corresponding to the PDCP packet may have been transmitted, while subsequent corresponding packet segments may have remained in the RLC buffer longer than a specified time limit. Based on a variety of factors, including RF metrics and the specified time limit, the UE may decide to discard those packet segments, freeing up resources to transmit a different, new (PDCP) packet received from the first layer, i.e. from the RLC buffer.

In one set of embodiments, the UE may first identify packets that have remained too long in a first-layer buffer, e.g. in an RLC buffer. The UE may use a second, shorter timer than the PDCP discard timer to determine when the RLC buffer is considered to be congested. In other words, the UE may monitor/track the duration (or time period) for which a respective packet remains in a first-layer buffer, using a timer different from the timer used (or provided) by the NW for determining congestion in a first-layer buffer. Based at least on that monitoring, the UE may decide to take certain specific actions (e.g. discard the respective packet or schedule transmission of the respective packet). The UE may also determine, based on available resources, e.g. available NW resources such as available transmit time intervals (TTIs) and available HARQ processes, to determine whether certain packets ought to be discarded. Such determination may also be associated with one or more second-layer buffers (e.g. HARQ buffers in the MAC layer), from where the packets (packet segments) may be transmitted and/or retransmitted.

In some embodiments, if the packets have remained in the RLC buffer for the specified shorter time period (e.g. 60 ms, which is shorter than the delay budget specified for the RLC buffer by the communications protocol between the UE and the eNB), and have not started over the air transmission, then the UE may schedule them if transmission time intervals (TTI) or grants are available for uplink (UL) transmission. Otherwise, the UE may start dropping (discarding) RLC packets (or RLC packet segments) that have already gone through the highest number of HARQ retransmissions and have still not been successful (i.e. they were deemed to have not been successfully transmitted and/or retransmitted).

When operating at the cell edge (e.g. operating at the edge of the RAT coverage area), the NW (base station) is most likely using RLC segmentation, so by dropping or discarding a single RLC packet (or RLC packet segment), NW resources may become available. The selection of the RLC packet on which the UE may operate, e.g. the RLC packet (segment) to be dropped or to be scheduled, may be based on the monitored/measured delay according to at least the second (shorter) timer, and may be further determined according to one or more of the following:

The "oldest packet" in the protocol buffer (e.g. RLC buffer), i.e. the packet that has been in the protocol buffer for the longest time duration among all packets currently in the protocol buffer. This determines which corresponding RLC packets or packet segments may be operated on.

The "oldest packet" in the HARQ retransmission, i.e. the RLC packet that has been scheduled for retransmission in the lower layer buffer (e.g. in the HARQ buffer) the earliest among all packets that have been scheduled for retransmission. RLC segments map to respective MAC PDUs in the HARQ buffer, and those MAC PDUs may be transmitted through a specified number of HARQ retransmissions.

The wireless communications device (e.g. UE) may also determine whether to split or bundle audio based on radio frequency conditions and/or buffer delay conditions (as described above). Typically, based on connected-mode discontinuous reception (CDRX), audio packets may be bundled by folding two audio packets into a single PDCP packet or single PDCP PDU as a function of CDRX, where 40 ms for a single PDU corresponds to two 20 ms audio packets. In one set of embodiments, the UE may decide to use one packet every 20 ms and perform RLC segmentation on that packet. That is, if so indicated by the metrics and/or buffer delay conditions (as previously described), the UE may perform RLC segmentation as soon as an audio packet is available from the Real-time Transport Protocol (RTP), which may be every specified time period, e.g. every 20 ms, before looking at the RLC buffer. The UE may then also determine if any of those RLC segments are candidates to be proactively dropped as also previously explained.

Retransmission Considerations

Further to the above, it should be noted that multiple retransmission mechanisms may be taken into consideration when determining which packets and what type of packets may be discarded by a wireless communications device. For example, two existing retransmission (ReTX) mechanisms in LTE may be taken into consideration. A first ReTX mechanism is HARQ ReTX, and a second ReTX mechanism is RLC ReTX. For VoLTE communications, HARQ ReTXs are performed but RLC ReTXs are not performed. In general, if ReTX of a packet (an RLC segment) is unsuccessful after having reached a maximum number of TX attempts, then the packet (RLC packet segment) may be discarded. Therefore, if RLC ReTX were also performed during VoLTE, then resulting additional TX (or ReTX) attempts would also be made for retransmitting each RLC packet segment. That is, each RLC packet segment could potentially undergo multiple rounds of ReTX attempts, resulting in multiple sets of HARQ ReTX attempts for a single RLC packet segment. For example, for non-VoLTE communications (non-VoLTE data), a specified (maximum) first number (e.g. 4) of HARQ ReTX attempts, and a specified (maximum) second number (e.g. 32) of RLC ReTX attempts may be made. That is, a total of 4×32 number of attempts may be made for retransmitting each RLC packet segment. This may greatly impact TX delays, which is why, typically, HARQ ReTX is performed and RLC ReTX is not performed for VoLTE communications (RLC un-acknowledge mode, or RLC-UM).

As previously indicated above, during VoLTE communications the UE (wireless communications device) may perform RLC segmentation on the RTP packets (i.e. an audio packet may be segmented into smaller size packets), due at least in part to the eNB providing/transmitting small UL grants. Because RLC retransmissions are not performed for VoLTE communications (as noted above), if one RLC packet segment is lost then the entire RTP (or audio packet) is lost. The RLC packet segment may be lost either due to congestion in the RLC buffer or due to bad RF conditions, whereby a maximum number of HARQ ReTXs has been reached and the decoding at the eNB still fails, resulting in the UE receiving a NACK from the eNB. Accordingly, in one set of embodiments, congestion and excessive battery consumption may be avoided by discarding an (entire) RTP (e.g. audio) packet for which a single RLC packet segment has failed to reach the eNB, as it would not be possible for the eNB or the MT (Mobile Termination) UE (i.e. destination UE) to reconstruct the audio packet if an RLC packet segment of that packet has been lost. Discarding such RTP packets may further help with congestion and may improve use of the NW resources.

In one set of embodiments, each RTP (e.g. audio) packet and its corresponding RLC segments and their associated status in the PHY layer may be monitored for each layer of multiple layers, e.g. for the PDCP, RLC, and MAC layers. Monitoring may include monitoring whether an RLC packet segment has been successfully transmitted or failed to successfully transmit, whether the RLC packet segment in the RLC buffer was discarded due to congestion (e.g. according to the PDCP discard timer), and so on and so forth. Thus, in addition to discarding a given (unsegmented) RTP packet or RLC segment if the number of ReTXs of that packet segment have reached a specified (maximum) value, monitoring a single RLC packet segment of multiple RLC packet segments of a segmented RTP packet may be performed to determine if the entire RTP packet ought to be discarded. In other words, in such cases an RLC packet segment of multiple RLC packet segments of a segmented RTP packet may be considered as opposed to only considering an RTP packet mapped directly to an RLC SDU (Service Data Unit). Accordingly, not only a single RLC packet segment may be discarded, but all RLC packet segments corresponding to a respective audio/RTP packet may be discarded. The relationship between an RTP packet and its RLC packet segments and the corresponding UL HARQ processes may be monitored to make a determination when an entire (previously segmented) RTP packet may be discarded.

FIG. 6

Figure 6:
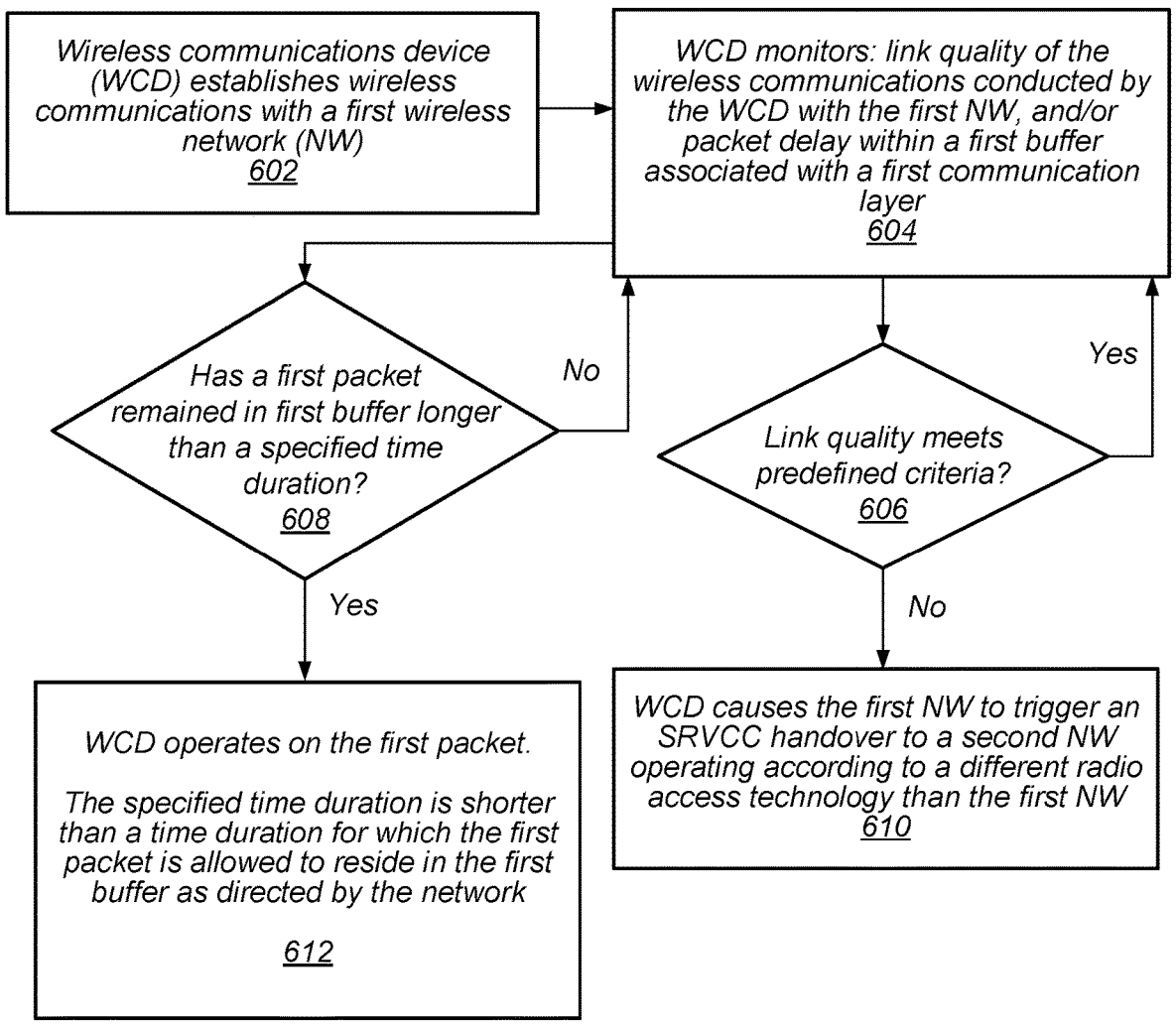
FIG. 6 shows a flow chart diagram illustrating an example of how wireless communications may be performed according to a first set of embodiments.

FIG. 6 shows a flow chart illustrating how wireless communications may be performed according to one set of embodiments. At 602, a wireless communications device (WCD) establishes communications with a first wireless network (NW), which may operate according to a specified RAT, for example according to LTE. The wireless communications may therefore include VoLTE communications. At 604, the WCD monitors the link quality of the wireless communications conducted by the WCD with the first NW, and/or monitors packet delay within a first buffer associated with a first communication layer. At 606, the WCD ascertains whether the link quality meets certain predefined criteria. At 608 the WCD ascertains whether a first packet has remained in the first buffer for longer than a specified time duration, i.e. longer than a first length of time. The first length of time may be specified to be shorter than a second length of time for which the packets are allowed to remain in the first buffer as directed by the network. To put it another way, the first length of time may be shorter than a second length of time which represents a maximum length of time for which the packets may remain in the first buffer according to network protocol and/or signaling, corresponding thereto, from the network (e.g. from a base station facilitating communications for the WCD at the present location of the WCD.)

If the link quality does not meet the predefined criteria ("No" branch taken at 606), at 610 the WCD causes the first NW (e.g. an eNB) to trigger an SRVCC handover to a second NW operating according to a different radio access technology than the first NW (e.g. a CS network such as 2G or 3G). If the link quality meets the predefined criteria ("Yes" branch taken at 606), no action is taken by the WCD with respect to (or due to) link quality. If the monitoring at 604 indicates that the first packet has remained in the first buffer longer than the first length of time ("Yes" branch taken at 608), at 612 the WCD operates on the first packet. At 604, the WCD may monitor performance characteristics associated with one or more communication layers as part of monitoring the link quality, where the communication layers may include a real-time transport protocol (RTP) layer, a media access control (MAC) layer, and a physical layer. Accordingly, monitoring the performance characteristics at 604 may also include monitoring packet jitter, buffer statistics, and/or packet loss in the RTP layer, and/or monitoring hybrid automatic repeat request block error rate, downlink assignment size, and/or or uplink grant size in the MAC layer, and/or monitoring transmit power of the WCD, link margin, reference signal received power, reference signal received quality, and/or signal-to-interference-plus-noise ratio in the physical layer.

In one set of embodiments, at 610, the WCD may cause the first NW (or eNB) to trigger an SRVCC handover by adjusting measured values indicative of the link quality, and transmitting the adjusted measured values to the first NW. The adjusted measured values may be indicative of worse link conditions than those indicated by the actual measured values. In another set of embodiments, at 610, the WCD may cause the first NW (or eNB) to trigger an SRVCC handover by sending a signaling message to the first NW requesting that the first NW perform the SRCVCC handover. The signaling message may be a non-access stratum enhanced service request message that includes proprietary extensions compatible with the first NW.

In some embodiments, at 612, the operation(s) performed by the WCD on the first packet may include the WCD scheduling the first packet for transmission, responsive to determining that the first packet has not been previously scheduled for transmission, for example from a lower communication layer than the first communication layer. The WCD may schedule the first packet for transmission further responsive to determining that transmit time intervals are available for uplink transmission. Alternately, also at 612, the WCD may discard the first packet, responsive to determining that the first packet has been previously scheduled for transmission and has not been successfully transmitted. The WCD may discard the first packet further responsive to determining that there have previously been a specified number of unsuccessful retransmission attempts of the first packet. In some embodiments, the first packet is an RLC packet (or packet segment) corresponding to a PDCP packet, and furthermore, the RLC packet segment may be one of two or more RLC packet segments that correspond to the PDCP packet. In addition, the RLC packets (or packet segments) may be mapped to packet data units stored in a second buffer corresponding to a second, lower communication layer, e.g. a HARQ buffer(s) in the MAC layer, from where the packets (packet segments) are transmitted or retransmitted (in case of unsuccessful transmission attempts).

FIG. 7

Figure 7:
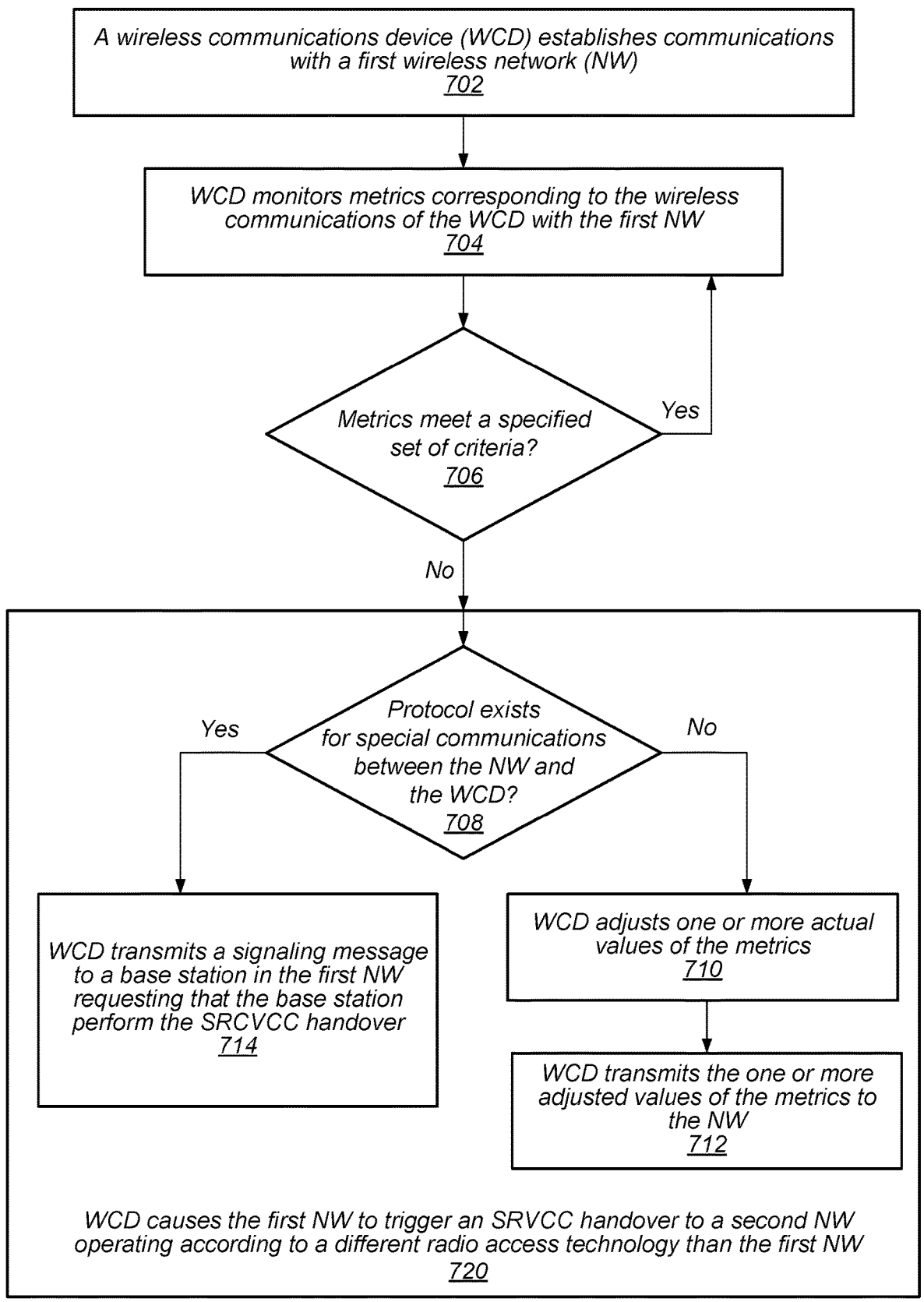
FIG. 7 shows a flow chart diagram illustrating an example of how wireless communications may be performed according to a second set of embodiments.

FIG. 7 shows a flow chart illustrating how wireless communications may be performed according to another set of embodiments. At 702, a wireless communications device (WCD) establishes communications with a first wireless network (NW), which may operate according to a specified RAT, for example LTE. At 704, the WCD monitors metrics corresponding to the wireless communications of the WCD with the first NW. At 706, the WCD determines whether the metrics meet a specified set of criteria. If the metrics do not meet the specified set of criteria ("No" branch taken at 706), at 720, the WCD causes the first NW (or eNB) to trigger a SRVCC handover to a second NW operating according to a different radio access technology than the first NW (e.g. to a CS network such as 2G, 3G).

In some embodiments, at 720, if there is no protocol between the NW and the WCD for conducting special communications ("No" branch taken at 708), the WCD causes the first NW to trigger a SRVCC handover by adjusting one or more actual values of the metrics (at 710), and transmitting the one or more adjusted values of the metrics to the first NW (at 712). The one or more adjusted measured values of the metrics are indicative of worse conditions of the wireless communications of the WCD with the first NW than those indicated by the one or more actual values of the metrics. Also at 720, if a protocol between the NW and the WCD for conducting special communications does exist ("Yes" branch taken at 708), the WCD causes the first NW to trigger a SRVCC handover by transmitting a signaling message to a base station in the first NW requesting that the base station perform the SRCVCC handover (at 714). The signaling message may be a non-access stratum enhanced service request message comprising proprietary extensions that can be interpreted by the base station.

In some embodiment, the metrics include performance characteristics associated with one or more communication layers, and may include packet jitter, in the RTP layer, buffer statistics in the RTP layer, packet loss in the RTP layer, HARQ block error rate in the MAC layer, downlink assignment size in the MAC layer, uplink grant size in the MAC layer, transmit power of the WCD in the physical layer, link margin in the physical layer, reference signal received power in the physical layer, reference signal received quality in the physical layer, and/or signal-to-interference-plus-noise ratio in the physical layer.

FIG. 8

Figure 8:
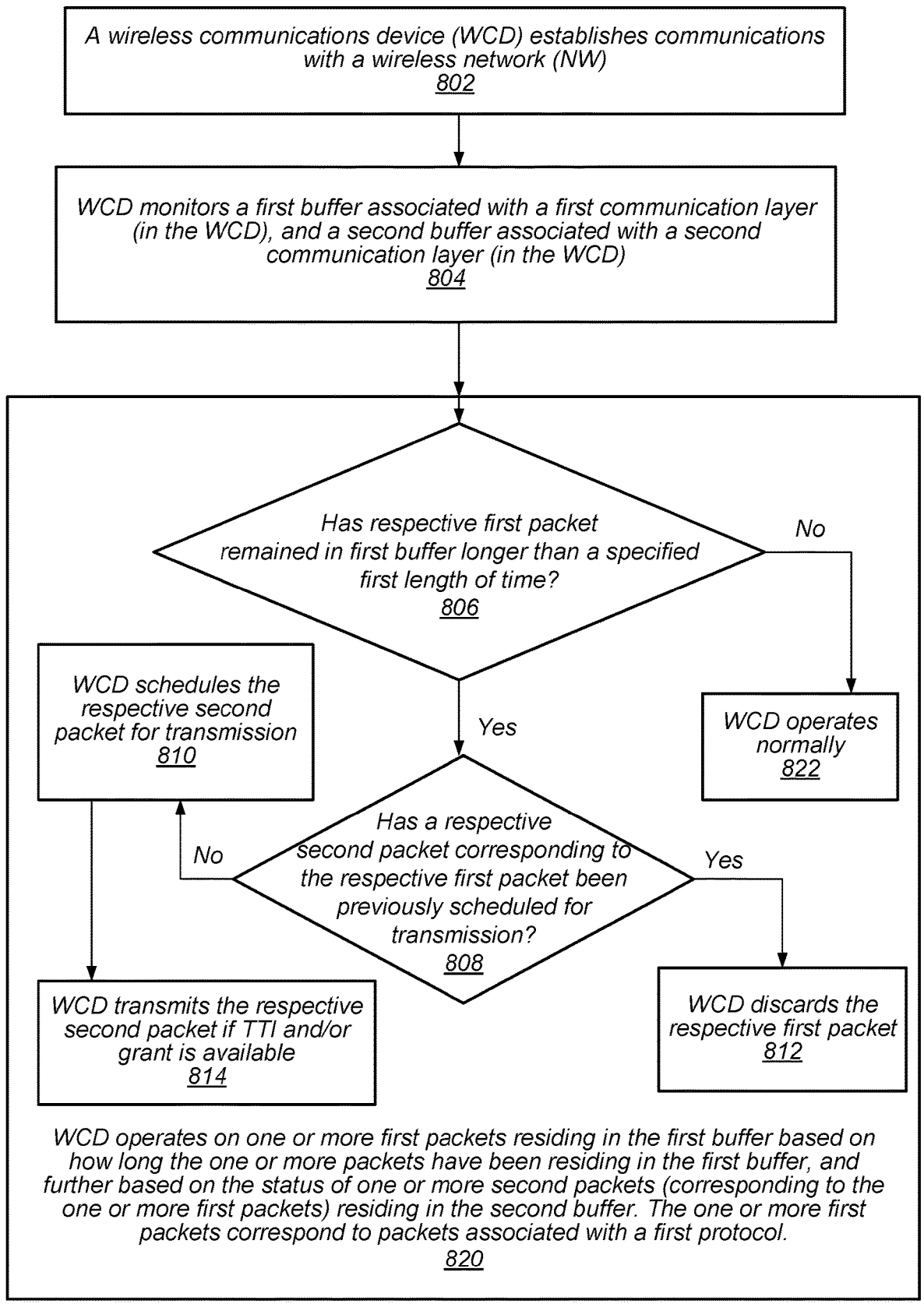
FIG. 8 shows a flow chart diagram illustrating how wireless communications may be performed according to a third set of embodiments.

FIG. 8 shows a flow chart illustrating how wireless communications may be performed according to yet another set of embodiments. At 802, a wireless communications device (WCD) establishes communications with a wireless network (NW), which may operate according to a specified RAT, for example LTE. At 804, the WCD monitors a first buffer included in the WCD and associated with a first communication layer (in some embodiments, an RLC buffer in the RLC layer), and also monitors a second buffer included in the WCD and associated with a second communication layer (in some embodiments, a HARQ buffer). At 820, the WCD operates on one or more first packets (e.g. RLC packets/packet segments) residing in the first buffer (e.g. RLC buffer) based on how long the RLC packet segments have been residing in the RLC buffer, and further based on status information corresponding to one more second packets (e.g. MAC protocol data units, or MAC PDUs) corresponding to the one or more first packets, where the second packets reside in the second buffer (e.g. HARQ buffer). The status information may include, for example, the number of hard retransmit attempts that have been made for a respective second packet corresponding to a respective first packet. It should be noted that for the purposes of discussion, references to transmission and retransmission of RLC packets may be understood as (also) referring to transmission and retransmission of the MAC PDUs corresponding to the RLC packets in question. The one or more first packets (e.g. RLC packets) also correspond to respective one or more packets associated with a first protocol. For example, at least two respective RLC packet segments may correspond to a PDCP packet.

As noted above, the second communication layer may represent a lower layer than the first communication layer within a hierarchy of communication layers that include the first communication layer and the second communication layer. For example, when (if) the first communication layer is the RLC layer, then the second communication layer is the MAC layer. In some embodiments, at 820, as part of operating on the one or more first packets, the WCD determines, at 806, whether a respective first packet (e.g. respective RLC packet segment) has remained in the first buffer (e.g. in the RLC buffer) longer than a specified first length of time, where the first length of time is shorter than a second length of time that each respective first packet (e.g. RLC packet) is allowed to reside in the first buffer (e.g. in the RLC buffer) according to network specifications. For example, action may be taken by the WCD if an RLC packet has remained in the RLC buffer longer than a specified length of time that is itself shorter than a length of time for which the packet is allowed by the network/base station to reside in the RLC buffer. If the respective first packet has remained in the first buffer longer than the specified first length of time ("Yes" branch taken at 806), the WCD determines, at 808, whether a respective second packet corresponding to the first packet has been previously scheduled for transmission. If the respective second packet has been previously scheduled for transmission ("Yes" branch taken at 808), then the WCD, at 812, discards the respective first packet (and the corresponding respective second packet). For example, the WCD may discard the respective first packet, since the respective second packet has been previously scheduled for transmission but has not been successfully transmitted.

Figure 9:
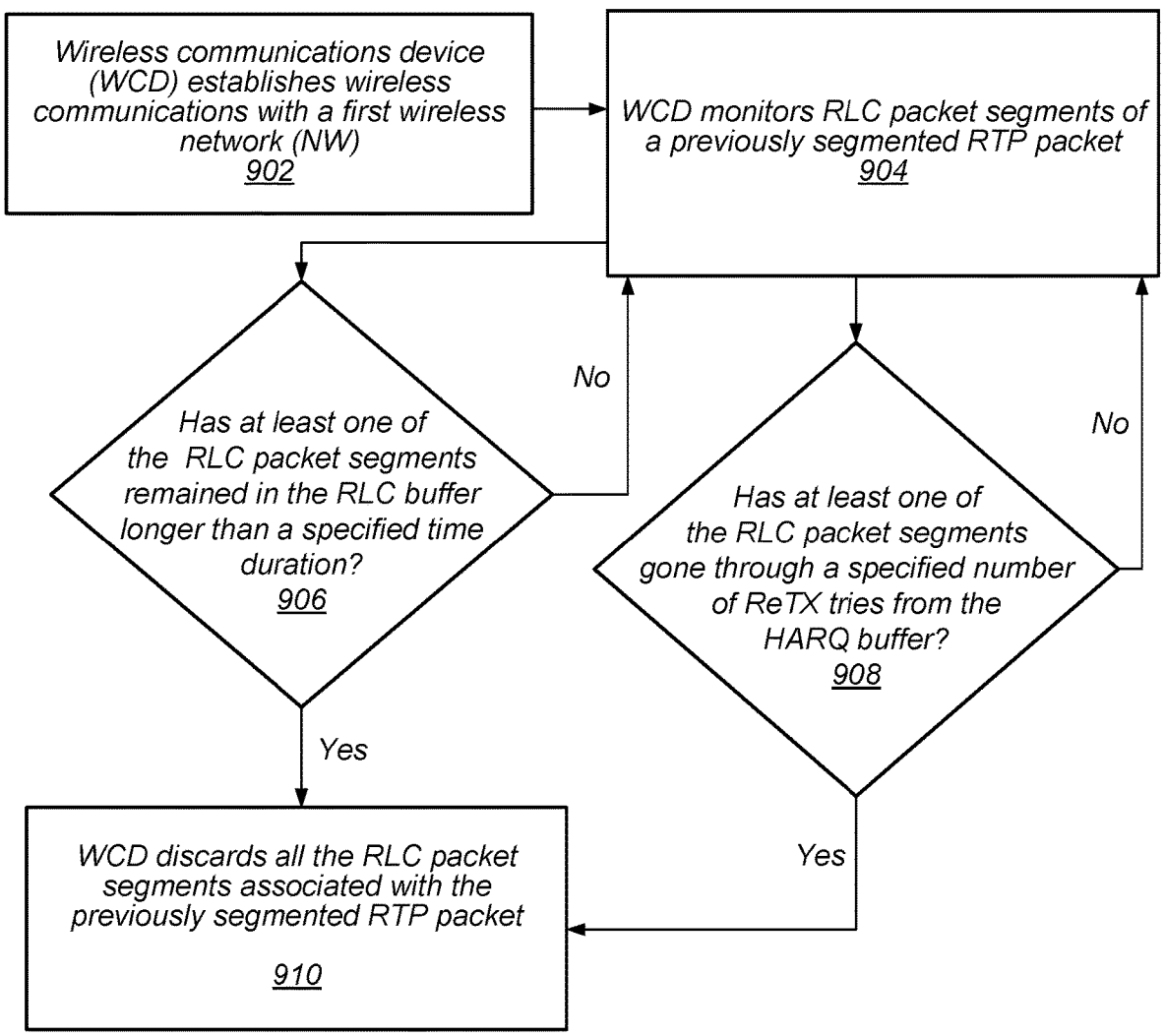
FIG. 9 shows a flow chart diagram illustrating how wireless communications may be performed according to a fourth set of embodiments.

If the respective second packet has not been previously scheduled for transmission ("No" branch taken at 808), then the WCD, at 810, schedules the respective second packet for transmission. At 814, the WCD may transmit the respective second packet when transmit time intervals and/or a grant is available for uplink transmission of the respective second packet. In some embodiments, at 808 the WCD may also determine if there have previously been a specified number of unsuccessful retransmission attempts of the respective second packet, and if there have been, the WCD discards the respective first packet (at 812) (and also the respective second packet from the second buffer). In some embodiments, the discarded respective first packet may be an RLC segment corresponding to a PDCP packet for which another RLC segment had already previously been transmitted.
FIG. 9

FIG. 9 shows an example of a flow diagram illustrating a method for wireless communications, according to yet some other embodiments. At 902, a wireless communications device establishes communications with a wireless network, for example an LTE network. The wireless communications device may monitor one or more packet segments of multiple packet segments of an entire (single) packet, where the single packet is associated with a first communication layer, and the single packet has been previously segmented into the multiple packet segments (904). For example, the wireless communications device (e.g. UE device) may monitor RLC packet segments of a previously segmented RTP packet (the RTP packet being associated with a PDCP layer). The RTP packet may be an audio packet that has been previously segmented, for example because of receiving small UL grants from an eNB, which forced the UE device to segment the audio packet into smaller packets.

At 906, the UE may determine if at least one of the monitored packet segments has remained too long in a first buffer associated with a second layer (lower than the first layer), for example whether at least one RLC packet segment has remained in the RLC buffer longer than allocated by a PDCP discard timer. If the packet segment has exceeded the allocated buffering time ("Yes" branch taken at 906), the UE may discard the packet segment, as well as all the other multiple packet segments associated with the previously segmented RTP (e.g. audio) packet (910). That is, if an RLC packet segment of the multiple packet segments that make up the entire RTP packet have remained too long in the RLC buffer, the UE may decide to discard that RLC packet segment and all other packet segments that make up the entire RTP packet.

At 908, the UE may determine if at least one of the monitored packet segments has remained too long in a second buffer associated with a third layer (lower than the second layer), for example whether at least one MAC PDU corresponding to the RLC packet segment has gone through a specified number of retransmission tries from an HARQ buffer and yet failed to reach the eNB. If that RLC packet segment (or MAC PDU corresponding to the RLC packet segment) has failed to reach the eNB, it is beneficial to drop all RLC packet segments that make up the previously segmented RTP packet, since the packet cannot be reconstructed by the eNB and/or mobile terminating UE. Accordingly, if at least one of the monitored packet segments has remained too long in the second buffer ("Yes" branch taken at 908), the UE may discard the packet segment, as well as all the other multiple packet segments associated with the previously segmented RTP (e.g. audio) packet (910).

In some embodiments, the communications established by the WCD with the NW may include connected-mode discontinuous reception (CDRX) communications. In at least one subset of such embodiments, at 820, the WCD may also perform segmentation of received audio packets at the first communication layer as soon as an audio packet is available from a real time transport protocol, instead of bundling audio packets as a function of the CDRX.

Embodiments of the present invention may be realized in any of various forms. For example, in some embodiments, at least portions of the present invention may be realized as a computer-implemented method, a computer-readable memory medium, or a computer system. In other embodiments, at least portions of the present invention may be realized using one or more custom-designed hardware devices such as ASICs. In other embodiments, at least portions of the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory memory device storing programming instructions executable by a processing element to cause a wireless communication device to: establish communications with a wireless network (NW); monitor a first buffer comprised in the wireless communication device and associated with a first communication layer; monitor a second buffer comprised in the wireless communication device and associated with a second communication layer; and operate, on one or more packets from among one or more first packets and/or one or more second packets, based on how long the one or more first packets have been residing in the first buffer, and further based on status information corresponding to the one or more second packets, wherein the one or more second packets correspond to the one or more first packets and reside in the second buffer; wherein the programming instructions are executable by the processing element to cause the wireless communication device to perform one of the following to operate on the one or more packets: discard one or more of the one or more first packets; or schedule one or more of the one or more second packets for transmission.

2. The non-transitory memory device of claim 1, wherein the second communication layer is lower than the first communication layer within a hierarchy of communication layers comprising the first communication layer and the second communication layer.

3. The non-transitory memory device of claim 2, wherein the first communication layer is a radio link control (RLC) layer and the second communication layer is a media access control (MAC) layer.

4. The non-transitory memory device of claim 1, wherein the one or more first packets are radio link control (RLC) packet segments and the one or more second packets are media access control packet data units.

5. The non-transitory memory element of claim 1, wherein the programming instructions are executable by the processing element to further cause the wireless communication device to: schedule select packets of the one or more first packets for transmission in response to determining that the select packets have remained in the first buffer for a first length of time and over the air transmission of the select packets has not yet started.

6. The non-transitory memory element of claim 5, wherein the programming instructions are executable by the processing element to further cause the wireless communication device to: schedule the select packets for transmission in response to further determining that transmission time intervals or grants are available for uplink transmission.

7. The non-transitory memory element of claim 5, wherein the first length of time is shorter than a second length of time, wherein the second length of time indicates how long the select packets are allowed to reside in the first buffer, as determined by the NW.

8. An apparatus comprising a processor configured to: cause a device to conduct wireless communications with a first wireless network (NW);
monitor packet delay within a first buffer comprised in the device and associated with a first communication layer; and
at least in response to determining from monitoring the packet delay that a first packet has remained in the first buffer longer than a first length of time but shorter than a second length of time, wherein the first packet is allowed by the NW to remain in the first buffer for the second length of time:
schedule the first packet for transmission, at least further in response to determining that the first packet has not been previously scheduled for transmission; and
discard the first packet, at least further in response to determining that the first packet has been previously scheduled for transmission and has not been successfully transmitted.

9. The apparatus of claim 8, wherein the processor is further configured to schedule the first packet for transmission further in response to determining that transmit time intervals are available for uplink transmission.

10. The apparatus of claim 8, wherein the processor is further configured to discard the first packet further in response to determining that there have previously been a specified number of unsuccessful retransmission attempts of the first packet.

11. The apparatus of claim 8, wherein the first packet is a radio link control (RLC) packet segment corresponding to a packet data convergence protocol (PDCP) packet.

12. The apparatus of claim 11, wherein the RLC packet segment is one of a plurality of RLC packet segments corresponding to the PDCP packet.

13. The apparatus of claim 8, wherein the processor is further configured to:
schedule the first packet for transmission further based on status information corresponding to a second buffer storing a respective packet that maps to the first packet; and
discard the first packet further based on the status information.

14. A device comprising:
radio circuitry configured to transmit and receive wireless signals for wireless communications of the device; and
control circuitry communicatively coupled to the radio circuitry and configured to:
interoperate with the radio circuitry to establish wireless communications with a first wireless network (NW);
monitor packet delay within a first buffer comprised in the device and associated with a first communication layer; and
at least in response to determining from monitoring the packet delay that a first packet has remained in the first buffer longer than a first length of time but shorter than a second length of time, wherein the first packet is allowed by the NW to remain in the first buffer for the second length of time:
schedule the first packet for transmission, further in response to determining that the first packet has not been previously scheduled for transmission; and
discard the first packet, further in response to determining that the first packet has been previously scheduled for transmission and has not been successfully transmitted.

15. The device of claim 14, wherein the control circuitry is configured to schedule the first packet for transmission at least further in response to determining that transmit time intervals are available for uplink transmission.

16. The device of claim 14, wherein the control circuitry is configured to discard the first packet at least further in response to determining that there have previously been a specified number of unsuccessful retransmission attempts of the first packet.

17. The device of claim 14, wherein the first packet is a radio link control (RLC) packet segment corresponding to a packet data convergence protocol (PDCP) packet.

18. The device of claim 17, wherein the RLC packet segment is one of a plurality of RLC packet segments corresponding to the PDCP packet.

19. The device of claim 14, wherein the control circuitry is further configured to:
schedule the first packet for transmission further based on status information corresponding to a second buffer storing a respective packet that maps to the first packet; and
discard the first packet further based on the status information.

20. The device of claim 19, wherein
the control circuitry is further configured to monitor the second buffer,
the second buffer is associated with a second communication layer, and
the status information corresponds to one or more packets residing in the second buffer.

* * * * *